Nov. 5, 1968     C. A. NANNEY     3,409,847
SOLID STATE PLASMA STRUCTURES
Filed Aug. 12, 1964
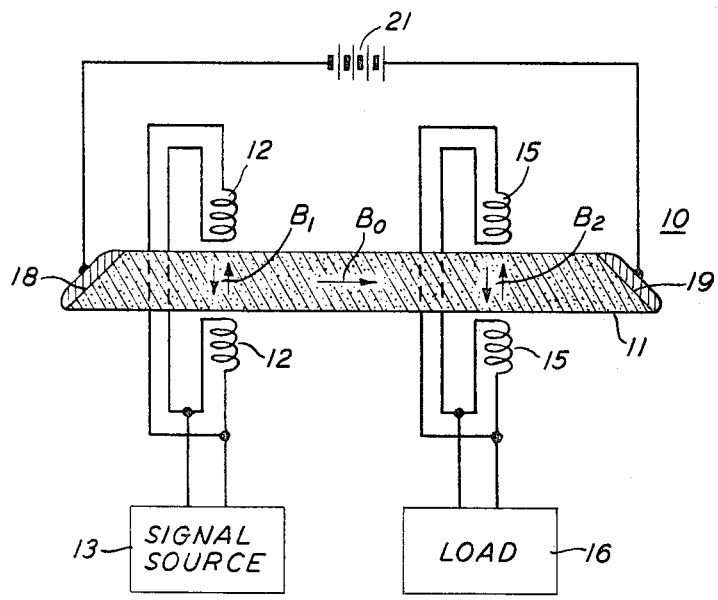
INVENTOR
C. A. NANNEY
BY
*Roderick B. Anderson*
ATTORNEY 3,409,847
SOLID STATE PLASMA STRUCTURES
Cecil A. Nanney, Murray Hill, N.J., assignor to Bell Telephone Laboratories, Incorporated, New York, N.Y., a corporation of New York
Filed Aug. 12, 1964, Ser. No. 389,148
1 Claim. (Cl. 333—30)

ABSTRACT OF THE DISCLOSURE

The end surfaces of a helicon wave propagating structure form an angle of 45 degrees with respect to the central axis and an axially directed magnet field for the purpose of reflecting residual wave energy in a direction perpendicular to the magnetic field, thereby causing rapid dissipation of the residual wave energy.

---

This invention relates to electronic devices, and more particularly, to solid state plasma structures which transmit electromagnetic wave energy in the form of helicon waves.

It has been found that plasmas are useful in high frequency electronic systems because they propagate electromagnetic waves at phase velocities that are significantly lower than the velocity of light. In its broadest sense, the term "plasma" refers to a medium of charged particles. Electromagnetic waves can be excited in a tube containing a medium of ionized gas and will travel at such a low velocity that the tube can be used as a delay line or a phase shifter. Also, the wave velocity can be adjusted to approximate that of direct electrical current in the plasma to give traveling wave interaction between the propagating wave and the current. As is known, such interaction can be employed to amplify the traveling wave or to generate traveling wave oscillations. Two general categories of waves that can travel in plasmas are longitudinal waves which are excited by fields that are parallel to the direction of wave propagation, and transverse waves, which are excited by fields that are transverse to the direction of propagation.

It has been found that slabs of appropriate solid materials can be used as plasma mediums for accomplishing the same results as gas plasma devices in approximately the same manner. A magnetic field can be established along the central axis of the slab with R-F fields applied transversely to the magnetic field to excite transverse electromagnetic waves in the slab. These transverse waves may be of the Alfven type which is characterized by linearly polarized fields, or the helicon type, which is characterized by circularly polarized fields. In general, transverse input fields produce Alfven waves in semimetals and intrinsic semiconductive materials, and helicon waves in extrinsic semiconductive materials. Semimetals include antimony, bismuth, arsenic, graphite and their alloys. Intrinsic semiconductive materials are those which possess electron and hole densities to substantially the same extent. Extrinsic semiconductors are those in which one mobile charge carrier is predominant, such as the p or n-type semiconductors.

As mentioned above, the present invention is concerned with solid-state devices which are capable of conducting helicon waves. The establishment of such waves requires a steady magnetic field along the length or longitudinal axis of a slab of extrinsic semiconductive material and input R-F fields which are transverse to the steady magnetic field. The invention is based on my utilization of the fact that helicon waves are incapable of propagating in a direction perpendicular to the magnetic field.

This invention is embodied in an illustrative device comprising a slab or rod of extrinsic semiconductive material having a steady magnetic field extending along a central or longitudinal axis. Input coils on opposite sides of one end of the slab produce R-F signal fields which are transverse to the central axis to excite helicon waves in the slab. Another pair of similar coils is located near the other end of the slab for abstracting helicon wave energy from the slab. The slab therefore essentially constitutes a waveguide for propagating electromagnetic wave energy at a slow phase velocity. The device can therefore be used as a delay line or a phase shifter. Also, D-C current can be established in the slab for interacting with the wave in accordance with known traveling wave interaction principles. Such interaction can be useful in reducing the attenuation losses associated with the wave propagation in the slab and with the input and output transducers. In special cases the interaction can be employed even to provide an amplified version of the input at the output.

When helicon waves are excited in the slab they propagate in a direction parallel to the magnetic field in both directions along the slab. In the absence of any modifications, the two end surfaces of the slab would reflect helicon energy back into the slab to create a resonant condition which would interfere with any of the uses of the device discussed above. This could be alleviated to some extent by tapering the end portions at a very acute angle and coating the end surfaces with absorbing material so that the helicon waves would be repeatedly reflected and to some extent absorbed. This would increase the length and general complexity of the device and may not be entirely effective for absorbing all of the helicon wave energy that is not utilized by the device.

In accordance with my invention the two opposite end surfaces of the slab are made to slope at an angle of substantially 45 degrees with respect to the central axis. Under this condition, the residual helicon wave energy is reflected at substantially 90 degrees with respect to the central axis and to the path of wave propagation and consequently also with respect to the steady magnetic field. Since helicon wave energy does not have the capacity to propagate in a direction transverse to the steady magnetic field, the residual helicon wave energy is rapidly damped after its reflection from the end surfaces.

These and other features of the invention will be better appreciated from a consideration of the following detailed description, taken in conjunction with the accompanying drawing, which is a sectional view of an illustrative embodiment of the invention.

Referring now to the drawing, there is shown a delay line 10 comprising a slab or rod 11 of extrinsic semiconductive material such as n-type PbTe. A steady magnetic field $B_0$ is produced within the slab which extends in a direction parallel to the central axis of the slab. The magnetic field is unidirectional and may be established by a permanent magnet or a solenoid which surrounds the slab 11. A pair of input coils 12 are located on opposite sides near one end of the slab and are excited by a source 13 of high frequency electromagnetic signal wave energy. Located near the other end of the slab are a pair of output coils 15 which are essentially identical to coils 12 and which are connected to an appropriate load 16.

In operation, the R-F signal source 13 produces R-F magnetic fields $B_1$ across the slab which are transverse to the central axis of the slab and the steady magnetic field. These fields produce electromagnetic wave energy in the slab which propagates along the slab as helicon waves. The nature of helicon waves is discussed, for example, in "Wave Propagation in a Gyromagnetic Solid Conductor: Helicon Waves," Physical Review, vol. 127, No. 3, Aug 1, 1962, A. Libchaber and R. Veilex. The magnetic fields $B_2$ associated with the helicon waves excite R-F currents in output coils 15. The output coils thereby effectively abstract helicon wave energy from the slab and transmit it to the load 16. Because the phase velocity of helicon waves is relatively low, the signal energy is substantially delayed as it travels from source 13 to load 16. Device 10 therefore acts as an effective delay line.

In accordance with the invention, the end surfaces 18 and 19 of slab 11 slope at an angle of substantially 45 degrees with respect to the central axis of the slab, the magnetic field $B_0$, and the direction of propagation of the helicon waves. It is characteristic that helicon waves do not have the capacity to propagate in a direction perpendicular to a magnetic field, and if they are projected in such a direction, they will rapidly damp out. Because the angle of reflection of reflected energy equals the angle of incidence of the energy on the reflecting surface, any helicon wave energy that is reflected from end surfaces 18 and 19 will be reflected in a direction that is perpendicular to the magnetic field and will therefore be rapidly dissipated. This is an important consideration because the input coils 12 project helicon waves toward end surface 18 as well as toward the output coils 15. Further, output coils 15 are not entirely efficient in abstracting helicon wave energy and a certain amount of residual helicon wave energy will reach end surface 19. If the waves impinging on the end surfaces were reflected back along the slab they would interfere with the main propagating wave and would set up spurious resonances within the slab which would degrade the performance of the device.

From the foregoing it is clear that for optimum attenuation of reflected energy, the end surfaces should form an angle of 45 degrees to reflect energy at 90 degrees with respect to the magnetic field. At other angles, a small reflected energy field component may be parallel to the magnetic field, thereby reducing the attenuation per unit of distance.

In a typical embodiment, the slab 11 may have a rectangular cross section with a width of 1.7 millimeters, a height of 1.7 millimeters, and a length of 12 millimeters. It is desirable that the semiconductive material exhibit a very high charge carrier mobility. To this end, the n-type PbTe is therefore advantageously refrigerated by an appropriate cryostat to a temperature near the temperature of liquid helium, where the charge mobility is high. A direct current voltage is preferably established along the length of the slab by a voltage source 21. Although this voltage increases the phase velocity of the helicon waves in the slab, it also reduces attenuation of the waves and is therefore usually desirable. The direct current voltage across the slab may be approximately 33 millivolts. The solder contacts on the end surfaces to which the voltage source is connected additionally dissipate residual helicon wave energy.

As is known, two conditions must be fulfilled for exciting helicon waves:

$$\omega < \omega_c \quad (1)$$

$$\omega_c \tau > 1 \quad (2)$$

where $\omega$ is the signal frequency, $\omega_c$ is the cyclotron frequency within the semiconductive slab, and $\tau$ is the mean collision time within the semiconductive slab. The cyclotron frequency is given by $$\omega_c = \frac{eB}{m^*} \quad (3)$$

where $e$ is the charge on an electron, $m^*$ is the effective mass of an electron and B is the flux density of the magnetic field $B_0$. If p-type semiconductive materials were used, the factors $e$ and $m^*$ would refer to the charge and effective mass of a hole while the factor $\tau$ of Equation 2 would refer to the mean time between collisions of holes. Since the device of FIG. 1 is a helicon wave device, the conditions of Equations 1 and 2 must be met. To this end, a magnetic field $B_0$ of 1000 gauss can be used with input signal frequencies of between .5 and 50 megacycles per second.

Although the device of FIG. 1 has been described as being a delay line, amplification may be achieved by adjusting the phase velocity of the helicon waves to be in approximate synchronism with the electron drift velocity in the device. P-type semiconductive material could be used, in which case the polarity on battery 21 should be reversed to give positive current flow in the same direction as the direction of wave propagation. The input and output couplers 12 and 15 could be replaced by resonant cavities or other structures for producing transverse electric fields for exciting and abstracting helicon wave energy if so desired. Various other arrangements may be made by those skilled in the art without departing from the spirit and scope of the invention.

What is claimed is:
1. An electronic device comprising:
a slab of extrinsic semiconductive material having a central axis;
means for producing a magnetic field along said central axis, thereby establishing an inherent cyclotron frequency within said slab;
input means for producing signal frequency fields which extend across a first discrete portion of said slab in a direction transverse to said central axis;
said signal frequency being smaller than said cyclotron frequency;
the product of the cyclotron frequency and the mean collision time of the slab being greater than one;
output means located adjacent a second discrete portion of said slab;
said output means comprising means for abstracting wave energy from said slab which is manifested by signal frequency fields which are transverse to said central axis;
said slab having end portions which slope at substantially 45 degrees with respect to said central axis, whereby residual wave energy in said slab is reflected in a direction transverse to the magnetic field thus attenuating such wave energy.

References Cited

UNITED STATES PATENTS

| | | | |
|---|---|---|---|
| 3,286,203 | 11/1966 | Gremillet | 333—24 |
| 2,743,322 | 4/1956 | Pierce | 333—30 |
| 3,173,102 | 3/1965 | Lowenstern | 330—39 |
| 3,196,384 | 7/1965 | Dumke et al. | 340—15 |
| 3,274,406 | 9/1966 | Sommers | 310—8.1 |
| 3,287,659 | 11/1966 | Ancker | 331—94 |

OTHER REFERENCES

Libchaber et al., Physical Review, vol. 127, pp. 774–76, 1962.

HERMAN KARL SAALBACH, *Primary Examiner.*

ELI LIEBERMAN, *Examiner.*

C. BARAFF, *Assistant Examiner.*